PARITY CHECK SWITCHING CIRCUIT

Filed Dec. 31, 1958 2 Sheets-Sheet 1

INVENTOR
JOSEPH J. MOYER
BY Edgar H. Kent
ATT'Y.

Nov. 28, 1961 J. J. MOYER 3,011,073

PARITY CHECK SWITCHING CIRCUIT

Filed Dec. 31, 1958 2 Sheets-Sheet 2

INVENTOR
JOSEPH J. MOYER

BY Edgar H. Kent
ATT'Y.

United States Patent Office 3,011,073
Patented Nov. 28, 1961

3,011,073

PARITY CHECK SWITCHING CIRCUIT

Joseph J. Moyer, Mahopac, N.Y., assignor to International Business Machines Corporation, New York, N.Y., a corporation of New York Filed Dec. 31, 1958, Ser. No. 784,281
8 Claims. (Cl. 307—88.5)

This invention relates to switching circuits to perform logical functions in electronic digital computers, and more particularly it concerns the checking of parity in computers of this kind.

Because of their complexity and speed of operation, electronic digital computers usually incorporate rather extensive checking circuitry to detect and indicate malfunctions. One of the most common type of checking circuits used is the parity check circuit whereby a number held in a register is examined to determine whether the aggregate of its digits having a selected value is odd or even, and whether the result agrees with the correct parity of the number, as previously determined. If the parity of the number as it stands in the register is incorrect, the assumption is that the number has been incorrectly handled by the computer, and an error signal is produced to indicate this. Transfer functions are commonly checked in this way, for example.

To determine the parity of a number, a counter adapted to respond in one-by-one fashion to the digits of the number is frequently used. A disadvantage of this scheme is that it is not fast enough, that is, it detracts appreciably from the speed at which computations can be carried out in many present day computing machines. Consequently, various ripple type circuits have been proposed for checking parity such as, for example, an arrangement of four pulse gates per register stage. Although an arrangement of this kind can be made to operate satisfactorily from the standpoint of speed, it requires relatively complex gate circuits embodying a considerable number of components.

It is a general object of the present invention, therefore, to provide an improved switching circuit suitable for checking parity.

A more specific object is to provide a high speed parity check circuit wherein a saving in components is effected.

In brief, the circuit according to the present invention makes use of four OR gates and four AND sections in a combination adapted to resolve the parity of two register stages simultaneously. Each OR gate is responsive to a pair of D.C. signals representing a selected combination of digits in the two register stages. Each AND circuit has two D.C. signal inputs and one pulse signal input, the D.C. signals being derived from the OR gates. In this way, two of the AND sections are conditioned to respond to $\overline{X}Y+X\overline{Y}$ and the other two AND sections are conditioned to respond to $XY+\overline{X}\overline{Y}$, where X, Y represent ones in the respective register stages and $\overline{X}$, $\overline{Y}$ represent zeros expressed in terms of Boolean algebra.

Of the two AND sections that are conditioned at one time, according to the value of the digits in the register, one is sensed by a pulse representing the parity of the lower ordered register stages, and it selects one of two lines to which the pulse is passed. In this way, the pulse is caused to appear at the proper AND section in the logical combination serving the next higher ordered pair of register stages as an indication of the parity of all of the preceding stages.

The novel features of the invention together with further objects and advantages thereof will become apparent from the following detailed description and the drawings to which it refers.

In the drawings conventional arrowheads designate lines carrying pulses and diamond-shaped arrowheads designate lines carrying D.C. levels. Also, in the drawings.

Figure 1:
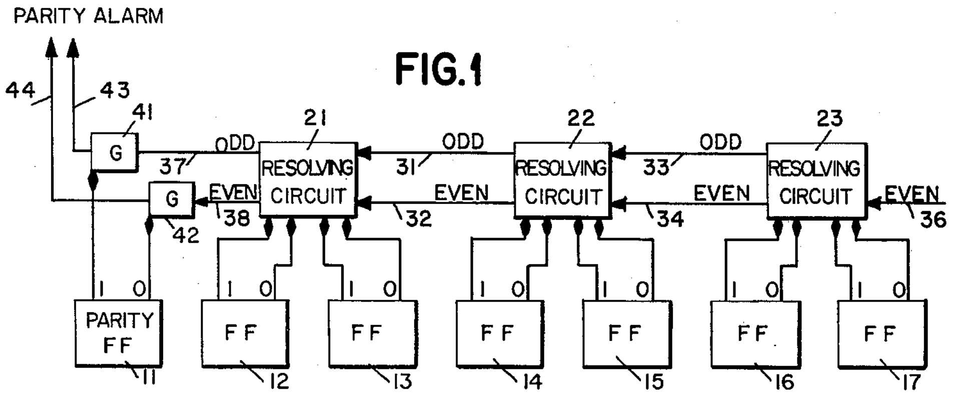
FIG. 1 is a block diagram illustrating the application of the circuit of the present invention to the checking of parity.

In FIG. 1 the numerals 11 through 17 refer to individual stages or orders of a register for the storage of binary digits. By way of example, each stage is deemed to comprise a bistable element or flip-flop. The number whose parity is to be determined and checked is held in stages 12 through 17 and the lowest numbered stage 11 holds the correct parity of the number, as previously determined. Although they have not been shown for the sake of clarity, it will be understood that each flip-flop has a pair of inputs to condition it which may be of an entirely conventional nature.

For each pair of flip-flops that go to make up the register, excluding the parity flip-flop, there is provided a parity resolving circuit according to the invention. Since a register of six flip-flops has been shown by way of example, three such resolving circuits are provided and these have been designated 21–23. Each resolving circuit has as inputs the one and zero outputs of its corresponding pair of flip-flops. In addition, the circuits 21 and 22 have pulse inputs 31, 33 and 32, 34, designated odd and even, respectively, while the circuit 23 has a single pulse input 36 designated even. As shown, these odd and even pulse inputs are derived from the resolving circuits for the next lower ordered pair of register stages, excepting of course the even input 36 for resolving circuit 23 which is not preceded by any other resolving circuit. Rather, input line 36 receives a pulse from any convenient source when it is desired to initiate parity checking.

Emanating from resolving circuit 21 are odd and even output lines 37 and 38 which sense a pair of gates 41 and 42. Gates 41 and 42 are conditioned by the respective one and zero sides of the parity flip-flop 11 to pass a parity error alarm pulse on one of two lines 43 and 44, if it turns out that the parity of the number stored in the register does not agree with the parity stored in the flip-flop 11.

To determine the parity of the number stored in the register, line 36 is pulsed to provide the effect of an even parity indication on resolving circuit 23. That is to say, it is as if an odd combination of ones could not exist in the preceding register stages, which is indeed the case since there are no preceding stages. In response to the pulse on line 36, circuit 23 resolves the parity of the flip-flops 16 and 17 by passing the pulse to a selected one of the odd and even output lines 33 and 34. For example, if one and only one of the flip-flops 16, 17 were standing in a one state, the pulse would be transmitted to the resolving circuit 22 by way of the odd line 33. Conversely, if neither or both of the flip-flops held ones, the pulse would be transmitted by way of the even line 34. Upon receipt of the pulse, the next resolving circuit 22 makes a parity determination on the basis of the parity which the pulse represents as well as on the basis of the digits held in the flip-flops 14 and 15. For example, if the pulse is passed by way of the odd line 33, and flip-flops 14 and 15 both hold ones, the pulse would be transmitted to resolving circuit 21 by way of the odd line 31. Conversely, if one of the flip-flops 14, 15 held a zero, the pulse would be passed on by way of the even line 32. Thus, in effect, parity indications of the register stages ripple through the resolving circuits from right to left in the drawing, the resulting parity being indicated in terms of a pulse on one of the lines 37 and 38. As aforementioned, disagreement between the result determined in this way, and the parity held in the flip-flop 11 causes an alarm pulse to be passed to one of the lines 43 and 44.

Figure 2:
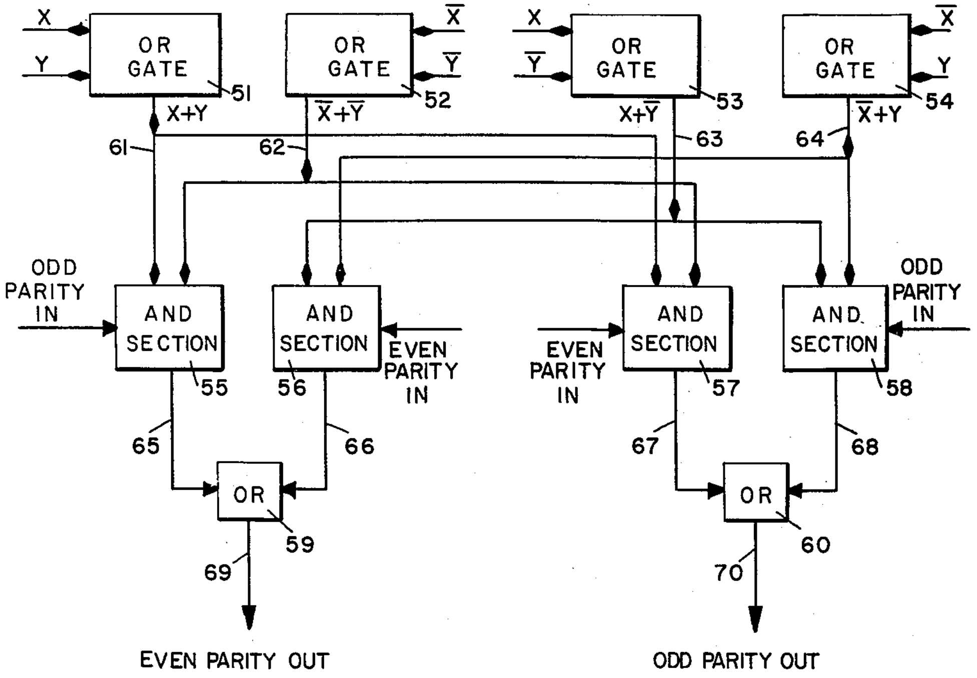
FIG. 2 is a block diagram of the circuit.

With reference now to FIG. 2, it will be observed that each parity resolving circuit includes four OR gates 51–54 and four AND sections 55–58. Also shown are two pulsed OR circuits 59 and 60 but as will appear, these involve merely a mode of connection as distinguished from the other logical elements which comprise transistor circuits.

OR gate 51 has two inputs X and Y corresponding to the one outputs of a pair of flip-flops such as flip-flops 14, 15 in FIG. 1, while OR gate 52 has two inputs $\overline{X}$ and $\overline{Y}$ corresponding to the zero outputs or sides of these same flip-flops. OR gates 53 and 54 have combinations of one and zero inputs, the combination X and $\overline{Y}$ being applied to OR gate 53, and Y and $\overline{X}$ being applied to OR gate 54. The output lines from the OR gates 51–54 have been designated 61–64, respectively, and serve to provide D.C. signals corresponding to the functions $X+Y$, $\overline{X}+\overline{Y}$, $X+\overline{Y}$ and $\overline{X}+Y$ expressed in terms of Boolean algebra. Selected combinations of these signals are then applied to the AND sections 55–58. Thus both the signals carried by lines 61 and 62 are applied to AND section 55 and to AND section 57. Similarly both the signals carried by lines 53 and 54 are applied to AND sections 56 and 58.

In addition to these signals which, in effect, condition a selected pair of the AND sections, pulses are applied to the AND sections which serve to sense them. In particular, a pulse representing that the preceding register stages have an odd parity is applied to AND sections 55 and 58, while a pulse representing that the preceding sections have an even parity is applied to the AND sections 56 and 57. Finally output lines 65, 66 from the AND sections 55, 56 are connected as pulse inputs to the OR circuit 59, and output lines 67, 68 from AND sections 57 and 58 are connected as pulse inputs to the OR circuit 60. OR circuits 59 and 60 have output lines 69 and 70 which provide selective indications of odd and even parity in the form of pulses.

More specifically, the operation of the circuit is as follows. The function derived by AND sections 55 and 57, neglecting for the moment the need for pulse input signals, is the product of $X+Y$ and $\overline{X}+\overline{Y}$. In Boolean algebra form the expression is $$\begin{array}{l} X+Y \\ \overline{X}+\overline{Y} \\ \hline X\overline{X}+\overline{X}Y+X\overline{Y}+Y\overline{Y} \end{array}$$

Since the terms $X\overline{X}$ and $Y\overline{Y}$ are equal to zero, the expression is equivalent to an exclusive OR function of the two register stages to which the resolving circuit pertains, namely $\overline{X}Y+X\overline{Y}$. In like manner, it can be shown that the function derived by AND sections 56 and 58, neglecting again the need for pulses, is $XY+\overline{X}\overline{Y}$. With these expressions in mind, it is a relatively simple matter to formulate a table which shows under what conditions pulses representing odd and even parity are produced on the lines 69 and 70. The following is such a table based on the three parities to which the circuit is responsive, namely, the individual parities of the digits in the two register stages and the parity indication in pulse form which takes account of all preceding register stages.

| Input Pulse Parity Indication | Functions of X and Y | Output Pulse Parity Indication |
|---|---|---|
| Even | $XY+\overline{X}\overline{Y}$ | Even. |
| Odd | $XY+\overline{X}\overline{Y}$ | Odd. |
| Even | $\overline{X}Y+X\overline{Y}$ | Odd. |
| Odd | $\overline{X}Y+X\overline{Y}$ | Even. |

Figure 3:
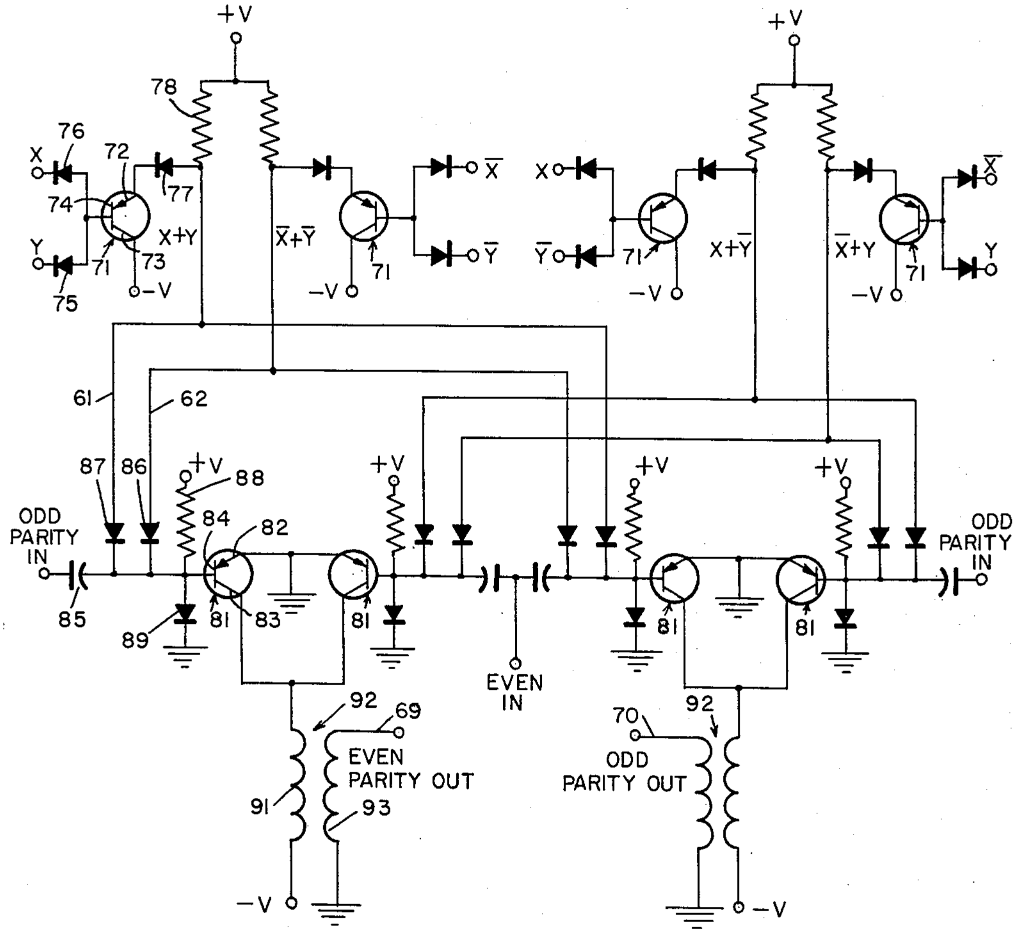
FIG. 3 is a schematic diagram of the circuit.

FIG. 3 illustrates in schematic form a preferred physical embodiment of the circuit of FIG. 2. With reference now to FIG. 3 wherein corresponding signal lines have been designated by the same reference characters, it will be observed that each OR gate comprises a transistor 71 preferably of the PNP microalloy type and having an emitter 72, a collector 73 and a base electrode 74. The input lines to the gate are connected in parallel to the base electrode 74 through diodes 75 and 76 which conduct asymmetrically. The emitter is connected to a source of positive potential +V through the series combination of a diode 77 and a resistor 78. To complete the circuit the collector is connected to a source of negative potential —V, and the junction of diode 77 and resistor 78 is connected to an output line such as line 61 of FIG. 2.

Those skilled in the art will readily recognize that transistor 71 is disposed in a conventional form of common emitter arrangement. Thus input signals impressed on either of the diodes 75, 76 serve to lower the potential of the base electrode, causing an increased amount of current to flow between emitter and base. As a consequence, current is turned on in the load circuit, causing the potential of line 61 to become appreciably lower. As is apparent, the same will be true whether either or both of the input lines to the diodes 75, 76 have a signal applied thereto.

Each AND section 55–58 comprises a transistor 81 of the PNP Drift type having an emitter 82, a collector 83 and a base electrode 84. The corresponding pulse input thereto is applied to the base electrode 84 by way of a capacitor 85. The D.C. signals thereto derived from the corresponding transistors 71 are applied in parallel to the base electrode 84 by way of diodes 86 and 87. Also there is a resistor 88 which connects the base to the source of positive potential +V, and there is a diode 89 through which the base is connected to ground. To complete the circuit, the emitter 82 is likewise connected to ground and the collector 83 is connected to the source of negative potential —V through the primary winding 91 of a transformer 92. The OR functions illustrated by means of elements 59 and 60 in FIG. 2 are realized simply by a common connection of each corresponding pair of the collectors 83 to the primary of one of a pair of transformers 92. The secondary winding 93 of each transformer 92 has one of its ends connected to ground and the other of its ends connected to an output line. The output lines correspond to lines 69 and 70 in FIG. 2 and are so labelled.

The particular form of AND section described in the foregoing is disclosed in more detail in the copending application of John W. Skerritt entitled Gated Pulse Amplifier and filed November 26, 1958. Briefly, its operation is as follows. Assuming that a signal is present on both of the lines 61 and 62, that is to say, the potentials of these lines are both negative, current in the load circuit of the transistor 81 served thereby will be turned on whenever a negative pulse appears at capacitor 85. This is because capacitor 85 is charged by current in the base-emitter path which, in this grounded emitter arrangement, increases the current flow in the emitter-collector path, from which an output pulse is derived. If a signal is absent on one of the lines 61 or 62, however, its potential will be positive and the corresponding diode 86 or 87 will be forward biased. As a consequence, when a negative pulse is applied to the capacitor 85, charging current therefor will be drawn from the positive line 61 or 62, rather than by way of the base emitter path of the transistor. Thus, the transistor will remain effectively turned off, which is its quiescent condition maintained by the circuit including resistor 88 and diode 89.

Although the invention has been described in connection with the checking of parity, those skilled in the art will recognize that it can be used in other ways with or without modifications that are within the spirit and scope of the invention. Therefore, the invention should not be deemed to be limited to what has been described in detail herein by way of example but rather it should be deemed to be limited only to the scope of the appended claims.

What is claimed is:

1. A switching circuit for use in an electronic digital computer, said switching circuit comprising four logical elements, each connected to produce an output signal which is an OR function of a unique pair of input signals selected from a group of four signals, a first circuit section connected to produce a first output pulse which is an AND function of a first pair of said output signals and a first input pulse derived from another switching circuit of like character, a second circuit section connected to produce a second output pulse which is an AND function of said first pair of output signals and a second input pulse derived from said another switching circuit, a third circuit section connected to produce a third output pulse which is an AND function of the remaining pair of said output signals and said first input pulse, a fourth circuit section connected to produce a fourth output pulse which is an AND function of said remaining pair of output signals and said second input pulse, first circuit means responsive to either of said first and second output pulses, and second circuit means responsive to either of said third and fourth output pulses.

2. A switching circuit as claimed in claim 1 wherein said first and second circuit means comprise first and second transformers, said first transformer having a primary winding to which is applied said first and second output pulses, and said second transformer having a primary winding to which is applied said third and fourth output pulses.

3. A switching circuit as claimed in claim 1 wherein each of said logical elements comprises a transistor having a pair of input circuits responsive to said input signals, an output circuit, and an asymmetrically conductive element disposed in each input circuit.

4. A switching circuit as claimed in claim 1 wherein each of said circuit sections comprises a transistor having an emitter, a collector, and a base electrode; a capacitor connected to said base electrode to pass input pulses, a pair of asymmetrically conductive elements coupled to said base electrode to pass output signals; a load impedance; and a source of direct voltage having its negative side connected to the collector through said load impedance, and its positive side connected to the emitter.

5. A switching circuit as claimed in claim 1 wherein said logical elements and said circuit sections comprise first transistors having first emitter, collector and base electrodes, and second transistors having second emitter, collector and base electrodes, a first pair of asymmetrically conductive elements connected to each of said first base electrodes to pass said input signals, a source of negative potential connected to each of said first collectors, first resistors, a source of positive potential connected to each of said first emitters through the respective first resistors, a third asymmetrically conductive element connected between each of said first resistors and each of said second base electrodes, a capacitor connected to each of said second base electrodes to pass said output pulses, and a transformer having a primary winding connected between selected pairs of said second collectors and said source of negative potential, said second emitters being connected directly to a common point intermediate said positive and negative potentials.

6. A switching circuit according to claim 5 including a second resistor connected between said source of positive potential and each of said second base electrodes and a fourth asymmetrically conductive element connected between each of said second base electrodes and said common point.

7. Apparatus to produce an indication of the relative states of at least four bistable elements, said apparatus comprising a first switching circuit including four OR circuit devices, each being connected to produce an output signal in response to a unique pair of input signals representing selected states of a first two of said bistable elements, at least two AND circuit devices each being connected to produce an output pulse in response to an input pulse and a selected combination of said output signals; and a second switching circuit including four OR circuits of like character as those in said first switching circuit, each being connected to produce an output signal in response to a unique pair of input signals representing selected states of the second two of said bistable elements, four AND circuit devices connected selectively to produce output pulses in response to the combination of a first pair of output signals from the OR devices of said second switching circuit and the output pulse from one of the AND devices of said first switching circuit, the combination of said first pair of output signals and the output pulse from the other of the AND devices of said first switching circuit, the combination of the remaining pair of output signals from the OR devices of said second switching circuit and said one output pulse, and the combination of said remaining pair of output signals and said other output pulse, circuit means responsive to either of a first pair of output pulses from two of said last-mentioned group of AND circuits, and circuit means responsive to either of the remaining two of the pulses from the last-mentioned group of AND circuits.

8. A switching circuit for use in an electronic digital computer to derive a parity indication of data signals stored in a pair of bistable elements, each said bistable element being adapted to produce a first signal when in one stable state and a second signal when in a second stable state, said switching circuit comprising four logical elements, each said logical element adapted to produce an output signal which is an OR function of a unique pair of input signals only and each being connected to receive a different pair of signals from said pair of bistable elements, one signal in each signal pair being from one of said bistable elements and the other signal in each signal pair being from the other bistable element, a first circuit section connected to produce a first output pulse which is an AND function of a first pair of said output signals and an input sampling pulse, said pair of output signals selected to indicate that the parity of said data signals stored in each of said bistable elements is the same as that of the other, a second circuit section connected to produce a second output pulse which is an AND function of the remaining pair of said output signals and an input sampling pulse, said remaining pair of output signals indicating that the parity of the data signals stored in each of said bistable elements is different from that of the other, and means for applying an input sampling pulse to said first and second circuit sections to produce an output signal from only one of said circuit sections by which circuit produces the output signal the parity of the data signals stored in said pair of bistable devices.

References Cited in the file of this patent

UNITED STATES PATENTS

| | | |
|---|---|---|
| 2,676,271 | Baldwin | Apr. 20, 1954 |
| 2,843,837 | Thaler | July 15, 1958 |
| 2,950,461 | Tryon | Aug. 23, 1960 |

FOREIGN PATENTS

| | | |
|---|---|---|
| 797,736 | Great Britain | July 9, 1958 |